(12) United States Patent
Johnson

(10) Patent No.: US 9,273,827 B1
(45) Date of Patent: Mar. 1, 2016

(54) COUNTERFORCE SAFETY SYSTEM

(71) Applicant: Roger N. Johnson, Mercer Island, WA (US)

(72) Inventor: Roger N. Johnson, Mercer Island, WA (US)

(*) Notice: Subject to any disclaimer, the term of this patent is extended or adjusted under 35 U.S.C. 154(b) by 0 days.

(21) Appl. No.: 14/098,326

(22) Filed: Dec. 5, 2013

(51) Int. Cl.
*A42B 3/06* (2006.01)
*A63B 71/10* (2006.01)
*F16P 1/00* (2006.01)

(52) U.S. Cl.
CPC ... *F16P 1/00* (2013.01); *A42B 3/06* (2013.01); *A63B 71/10* (2013.01); *A63B 2220/44* (2013.01); *A63B 2220/53* (2013.01)

(58) Field of Classification Search
CPC .......... A42B 3/00; A42B 3/0486; A42B 3/06; A42B 3/122; A42B 3/067; A42B 3/069; A42B 3/04; F16P 1/00; A63B 2220/40; A63B 2220/44; A63B 2220/53; A63B 71/10
USPC ......... 2/411, 413, 414, 425, 455, 6.8; 124/26; 180/271
See application file for complete search history.

(56) References Cited

U.S. PATENT DOCUMENTS

| | | | |
|---|---|---|---|
| 5,524,374 A | 6/1996 | Gernstein | |
| 6,014,769 A | 1/2000 | Baudou et al. | |
| 8,127,373 B1* | 3/2012 | Fodemski | 2/413 |
| 2009/0064396 A1* | 3/2009 | Ghajar | 2/411 |
| 2013/0125296 A1* | 5/2013 | Rabinovitch | 2/413 |

\* cited by examiner

*Primary Examiner* — Keith Frisby
(74) *Attorney, Agent, or Firm* — Rimon, P.C.

(57) ABSTRACT

A kinetic response system comprising an impact member to receive an impact force thereto, one or more annular guides positioned proximate the impact member, one or more projectile masses to respectively travel along the one or more annular guides, a kinetic energy converter to accelerate the one or more projectile masses along the one or more annular guides, and a controller to selectively trigger the kinetic energy converter to accelerate the one or more projectile masses along the one or more annular guides. The one or more projectile masses being accelerated in response to the impact force contributing to acceleration of the impact member above a defined threshold. The accelerated projectile masses create a rotational force to cause a kinetic push against the impact member in opposition to the impact force.

17 Claims, 16 Drawing Sheets

COUNTERFORCE SAFETY SYSTEM

FIELD

Embodiments of the invention relate generally to the field of safety, and more specifically to providing counterforce safety systems that increases the safety of a user.

BACKGROUND

Safety systems are known in the prior art. Such safety systems typically include helmets, face shields, steel toed boots, and equivalents. In the prior art, the safety systems are entirely passive, and each safety system absorbs whatever forces and energies that would otherwise injure the user who wears the safety system.

The prior art for non-passive safety systems is limited. There is a U.S. Pat. No. 6,014,769, filed by Baudou et al. and issued on Jan. 18, 2000, that has a limited means to use stored energy which involves reducing the inertial effect of attached mass to a helmet. The disclosed invention is designed to use stored energy to separate a heavy item attached to a helmet during a deceleration event in order to mitigate the inertial effect on the head. The separation energy is not designed to do more than simply isolate the helmet from an attached mass. There is no disclosure to add energy more than is required to separate the masses.

There is a U.S. Pat. No. 5,524,374, filed by Gernstein et al. and issued on Jun. 11, 1996, that discloses the use of stored energy to "deliver impact energy to the shotgun in a direction opposite to that of the recoil energy and at a time that is selected to most effectively neutralize that recoil energy." The patent discloses creating a force in line with that created by the accelerating bullet that is able to effectively neutralize the kickback. No part of this patent discloses creating forces other than in line with barrel.

SUMMARY

Embodiments of the present invention provide methods to manufacture a counterforce safety system and implementations of a counterforce safety system. Embodiments of the invention can be implemented in numerous ways. Two aspects of the invention are described below.

A first aspect of the invention is directed to a method to make a counterforce safety system. The method includes installing a stored energy holder; installing a kinetic energy converter to be powered by the stored energy holder; installing a projectile mass to be accelerated by the kinetic energy converter; installing a projectile guide in proximity to the counterforce safety system to guide the projectile mass along a desired path; and installing and coupling at least one sensor in proximity to the counterforce safety system to selectively trigger the acceleration of the projectile mass to increase the safety of a user.

A second aspect of the invention is directed to counterforce safety system. The counterforce safety system includes a stored energy holder; a kinetic energy converter to be powered by the stored energy holder; a projectile mass to be accelerated by the kinetic energy converter; a projectile guide in proximity to the counterforce safety system to guide the projectile mass along a desired path; and at least one sensor in proximity to the counterforce safety system to selectively trigger the acceleration of the projectile mass to increase the safety of a user.

BRIEF DESCRIPTION OF THE DRAWINGS

Non-limiting and non-exhaustive embodiments of the invention are described with reference to the following figures or drawings.

DETAILED DESCRIPTION

Figure 1:
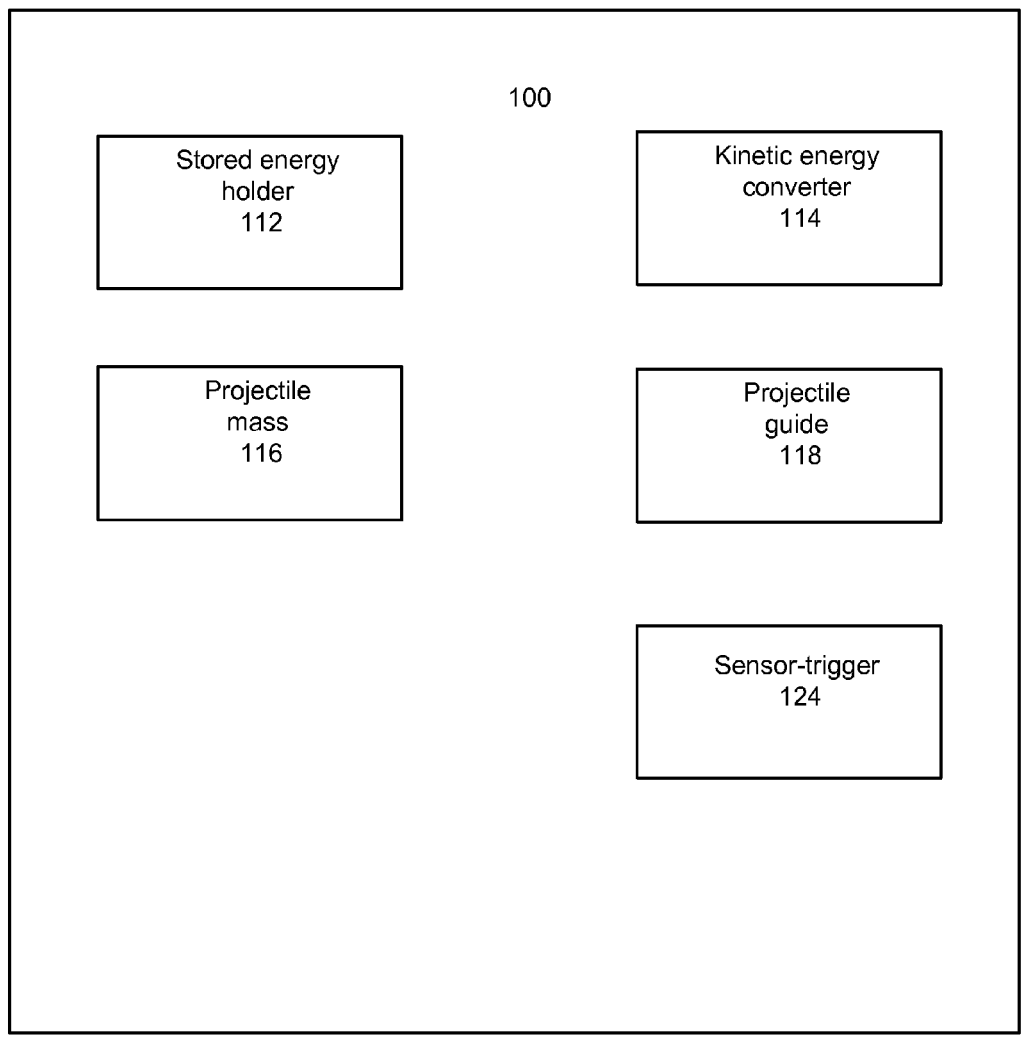
FIG. 1 illustrates a block diagram of the elements of a counterforce safety system, in accordance with one embodiment of the invention.

Embodiments of the inventions can be constructed from off-the-shelf components. In all of the embodiments disclosed below, different materials could be included with the counterforce safety system, including but not exclusively: various plastics, resins, papers, fabrics, leather, fibers, ceramics, and metals. In the embodiments disclosed below, additional different materials could be included with the counterforce safety system, such as rayon, nylon, polyester, silk, cotton, wool, and other fabrics. The metal pieces would typically be made from a metal or some metal alloy, but could alternatively be made from other resilient materials, such as plastics, and other equivalent manmade materials. One embodiment of the invention can be also be controlled by personal electronics, including a cell-phone, a smart-phone, or an equivalent device. One embodiment provides a removable water and sweat resistant liner that seals the electronics and has a gasket for inserting electrical wiring. One embodiment will enable the user to have tactile navigation of the controls of the counterforce safety system. One embodiment provides a manual switch to override one or more automatically controlled sensors that adjust, turn on or turn off electrical power to the counterforce safety system.

The present invention introduces new methods and apparatus to prevent or reduce injury. One embodiment of the invention is designed to store energy for the purpose of expending it kinetically in the generation of force caused by acceleration. It is somewhat contradictory that adding energy to an event where excess energy is the problem can help. In addition, one embodiment of the invention provides ways to react to impacts from different directions and intensities within the confines of acceptable equipment sizes and weights. Various embodiments of the invention provide a counterforce safety system for items such as a helmet, a pair of boots, a pair of shoes, an ankle brace, a knee brace, a bicycle, a motor bike, a motorcycle, a ski, a snowboard, a chair, a car, a truck, a sport utility vehicle, a boat, and an airplane.

The problem of preventing physical injury to a human body is solved by deploying stored energy against a mass such that the force resulting from its acceleration is able to limit the damage that would otherwise have occurred. Many human activities, such as sports, involve contact with other players, game objects and the environment. This physical contact can cause injury and there are many devices to protect human users. The list includes helmets, cups, guards, glasses, gloves, shoes, etc. Injury can occur when an impact occurs with enough force or speed to overwhelm the ability of the safety system to either withstand or somehow avoid the hit. A collision between players is mediated with helmets and padding and a collision between a player and a puck is mediated with a face guard and mouthpiece. Even a pair of shoes modifies the interaction between the foot and the ground, sometimes reducing the strike force and other times preventing a damaging foot rotation.

In most cases the protective device is passive and serves to redistribute the energy brought to the contact zone. Often the impact overwhelms the padding or presents its force in a way human limbs are unable to safely control. A helmet hit that causes a concussion and a rolled ankle are a few examples. Various embodiments of this invention include safety systems and methods that actively create directed forces on a human body or its protective gear. For example, a helmet incorporating one embodiment of this invention can reduce impact generated g-forces during some tackles by a factor of three. One embodiment can be incorporated into a pair of shoes or boots, where it is capable of preventing an ankle sprain by slowing the event down in order for a person to be able to react in time.

A common safety system is a helmet which serves to absorb a high impact in one location and to distribute the energy in space and time such that less damage occurs. Safety pads will for example take a hit on a small area and redistribute it to a larger area. In addition to this, most helmets spread out the impact in time such that peak accelerations to the head are reduced. In this fashion some blows that would have cracked the skull or caused excessive movement to the brain can be reduced to safer levels. Helmet shells reliably prevent bone damage, but are limited in their ability to damaging accelerations that can cause soft tissue brain damage. Most helmets use a cushioning material that compresses under the incoming force at a rate designed to minimize the head's acceleration. A perfect pad would use the cushion thickness to bring the head up to final impact velocity at a constant acceleration. One of the challenges is to accomplish this despite impact hits of varying intensity and impact locations. Eliminating concussion damage across the range of varying speeds and forces with a single cushion curve is very difficult. Designing a cushion to simultaneously absorb rotational accelerations adds another level of difficulty.

Prior art efforts to improve the helmet's ability to limit head impact damage have focused on lowering the peak acceleration with better cushioning and by managing damaging head rotations. The cushioning devices are designed to more accurately accommodate hits of varying intensity with tailored shock absorber like pneumatic action and improved foams. Providing additional cushion thickness (that increases helmet size) improves the ability to lower peak acceleration, but can increase the torque of damaging "twisting" movements caused by certain hits. Some helmets have inner liners that improve coupling to the head, while allowing the helmet shell a limited "slip" during an impact, thereby reducing rotation induced damage. All of these protective strategies are limited to dissipative actions in that they only absorb or redirect the impact energy.

Current helmet designs attempt to smooth out the very high acceleration peaks with passive padding to cushion the applied forces. The padding allows an extended period of time for the colliding masses to attain their final speed. The head within the helmet can be brought up to speed slower and the extra time gained is limited by the time it takes to compress the cushioning. The specific compression curve determines how well different hits are accommodated.

Discussion of Helmet Embodiments

One embodiment of the present invention improves a helmet (e.g., a sport helmet, motorcycle helmet, construction helmet, head protector, combat helmet, and equivalents). A helmet is worn during an activity for safety regarding head injuries. For example, a sport helmet is worn during a sport activity (e.g., football, baseball, boxing, martial arts, etc.) for protection. In general, a helmet cannot be over a practical size or weight, and it needs to provide for a practical range of motion, sight and sound to actually be used as a helmet. In one embodiment, all head accelerations in the first 10 milliseconds after an impact would be reduced to less than 80 G's. In other embodiments, there would be additional types of head rotations that mitigated. Impacts from other players as well as ground or fence impacts need to be considered.

One embodiment of the invention is adapted to a helmet in conjunction with conventional cushioning is able to significantly reduce impact damage. An amount of stored energy deployed at the correct moment in the right direction against a mass, will for the duration of the acceleration, create a useable counter force that can be wielded for improved safety. As a result current helmet technology can be improved on by using stored energy to accelerate a mass in order to create directed forces during impact.

The laws of physics teach that force (F) equals mass (M) multiplied by acceleration (A) (F=M×A). This quantifies the large force that a massive tackler exerts against a helmet target and why the target is at such a disadvantage. The helmet is neither massive nor moving. During the hit the tackler is decelerated at the expense of accelerating the helmet of the tackled such that the forces are equal. This makes the less massive helmet experience very high accelerations. Once the hit is complete, both the players will be traveling at a similar speed and the accelerations disappear. A player hitting the ground may create a second abrupt change in speed and possible damage.

Collisions modeled with a straight line collision (without rotation) demonstrate the value of using stored energy to limit target accelerations. Consider a small tackler traveling at 8 meters per second with a mass of 25 kilogram of striking a stationary helmet/head of 3 kilogram mass. This example represents a hit where about one-fourth of the mass of the tackler contributes to the hit and is directed along the neck of the impact target. None of the impact energy delivered to the helmet is redirected into the body mass of the target and serves to only accelerate the helmet. The ideal helmet used in this example absorbs no energy other than within the 2.5 centimeters of perfect padding. Using conservation of momentum, the final speed of the tackler and helmet is 7.14 meters per second. The final velocity is attained after 3.5 milliseconds. This represents a helmet acceleration of 216 G's, or about 300% of the NFL guideline limits, nearly assuring an injury.

In one embodiment, fitting the helmet with a stored energy device capable of accelerating a 0.1 kilogram mass to 250 meters per second during 8 milliseconds of impact limits the acceleration to a relatively safer 78 G. The projectile mass's final speed of 250 meters per second is approximately the exit velocity of a powerful air rifle and one-fourth the bullet velocity of a military rifle. For example, in a sport such as football, if the tackler's mass is increased to 70 kilograms, more stored energy and a higher final velocity is required. In one embodiment, generating this counter force requires only 3.125 kilojoules.

The total energy required to reduce helmet accelerations to a safe range requires a small amount of energy that is easily stored in the helmet, with enough for multiple interventions. This amount of energy used to reduce the head acceleration described in this example is equal to the following: (a) twice the powder charge of an M16 rifle bullet round, (b) one-third the electrical energy of an AA battery, (c) 2.75 cubic inches (45.06 cubic centimeters) of air at 2000 pounds per square inch (PSI), (d) 0.007 cubic inch (0.1147 cubic centimeters) of LP gas, (e) the amount of energy to heat 0.75 liter of water by 1 degree Celsius.

In one embodiment, the helmet is designed to protect multiple times on a single charge. In most hits the invention would not selectively trigger and conventional passive systems would provide the safety. By analogy, this is like an air bag that only deploys in an actual accident. The deployment would be able to select a response best suited to the type of impact (direct, avoid, rotate, delay, etc). For example, in one embodiment of the invention, three AA batteries could provide 9 protective interventions. If a variable kinetic response is available in the embodiment of the invention, the number of interventions on a charge increases.

There are various ways to create the force and to direct it from the stored energy. Helmet collisions with exceptionally massive or immoveable targets (like the ground) require using kinetic energy to create forces that can reorient the helmet or redistribute the damage in preferential ways.

In one embodiment, the counter force is directed against the helmet on the opposite side from an "in-line" hit can for the duration of the acceleration reduce the net force acting on the helmet. As a result the helmet moves at slower rate and accelerates the head slower.

In one embodiment, the counter force could also serve to reorient the head away from a blow known to cause damage towards a safer orientation. Certain side hits to the head might be able to turn the head during the hit in ways that lower damage potentials. The reorientation might also preposition the head in order to direct the impact force into other body masses, thereby lowering the combined acceleration due to the larger combined inertia of the head and body.

In one embodiment, the reorientation could be enacted during the entire acceleration episode such that a larger area of the brain is affected and possibly reducing concentrated stresses that would otherwise cause damage.

In one embodiment, one use of the stored energy would be to reorient the head for a safer impact. Some people use this strategy during a fall and limit injury with a sort of "tuck and roll". Some people do this when they fall by choosing to land on a shoulder instead of their face.

Most injuries caused by impacts occur faster than human reactions are able to respond, which means that people frequently cannot "tuck and roll" in time. Concussions occurs in about one-tenth of the time of the time it takes for people to begin reacting. One embodiment of the invention can respond in at the very beginning of a hit and have finished providing its corrective kinetic push before a user can initiate a response.

In one embodiment, in order to accommodate hits from different directions, a reaction force is generated that can be directed in any direction. This is created by the summing of accelerating weights along curved paths in three orthogonal planes. The rotational force each mass creates when accelerated by the stored energy sums to a single direction. This requires the masses to be accelerated at various rates in either direction along their paths.

In one embodiment, the invention looks like normal helmet from the outside. In one embodiment, inside the helmet are three annular tubes arranged orthogonally such that they don't interfere with the player. Inside each tube is a weighted slug containing pressurized air and quick acting adjustable valves at either end. A controller device is located in the back of the helmet in contact with each of the three rings. It contains acceleration sensors and a decision network able to release each of the slugs in a direction and rate such that the combined force best protects the user. After each release, the slugs can be repositioned and recharged for the next event. In one embodiment, this helmet is designed to operate like an air bag and deploy only when an extreme event occurs.

FIG. 1 illustrates a block diagram of the elements of a counterforce safety system, in accordance with one embodiment of the invention. Referring to FIG. 1, a counterforce safety system 100 includes a stored energy holder 112, a kinetic energy converter 114, a projectile mass 116, a projectile guide 118, and a sensor-trigger 124. In one embodiment, the sensor-trigger 124 is physically located inside the remainder of the counterforce safety system 100. In one embodiment, the sensor-trigger 124 is physically located outside the remainder of the counterforce safety system 100.

Figure 2:
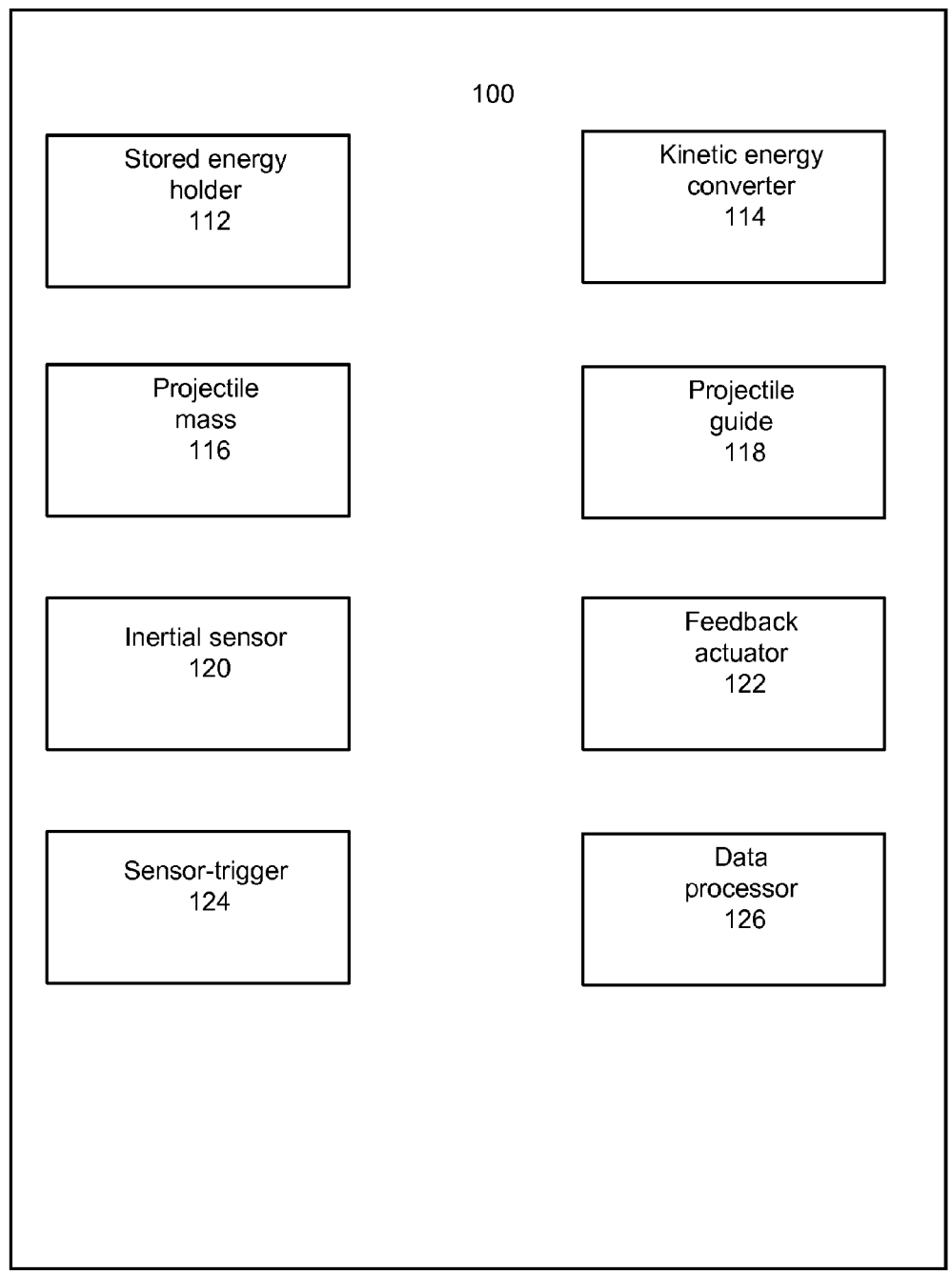
FIG. 2 illustrates a block diagram of the elements of a counterforce safety system, in accordance with another embodiment of the invention.

FIG. 2 illustrates a block diagram of the elements of a counterforce safety system, in accordance with one embodiment of the invention. Referring to FIG. 2, a counterforce safety system 100 includes a stored energy holder 112, a kinetic energy converter 114, a projectile mass 116, a projectile guide 118, an inertial sensor 120, a feedback actuator 122, a sensor-trigger 124, and a data processor 126.

Figure 3:
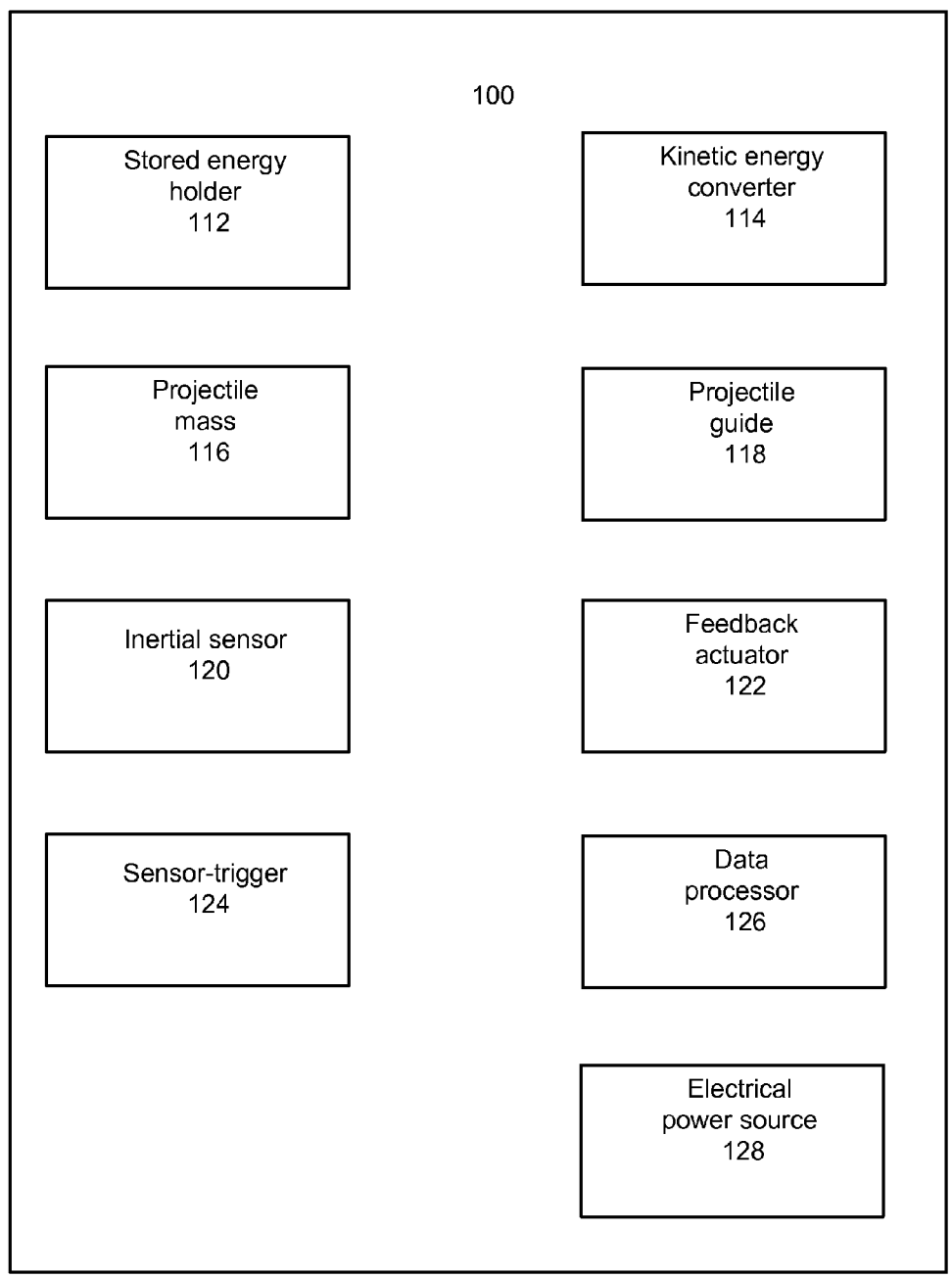
FIG. 3 illustrates a block diagram of the elements of a counterforce safety system, in accordance with another embodiment of the invention.

FIG. 3 illustrates a block diagram of the elements of a counterforce safety system, in accordance with one embodiment of the invention. Referring to FIG. 3, a counterforce safety system 100 includes a stored energy holder 112, a kinetic energy converter 114, a projectile mass 116, a projectile guide 118, an inertial sensor 120, a feedback actuator 122, a sensor-trigger 124, a data processor 126, and an electrical power source 128.

In various embodiments, a counterforce safety system may include part or all of the following elements: (1) stored energy device, (2) a kinetic energy converter, (3) a projectile, (4) a projectile guide, (5) an inertial direction controller, (6) a feedback actuator, (7) a sensor-trigger and (8) a data processor that is able to select the best way to deploy the stored energy.

Stored Energy Device: This device is designed to hold the potential energy and to release it at a high rate. The tackler in a previously discussed example requires 3125 Joules to be released in 0.008 seconds—which amounts to over 250 hp, or the peak ability of a single disc car brake. For various embodiments, stored energy devices with capacities in this range include the following.

Chemical: Explosive fuel such as used in ammunition or rockets. Igniting the fuel could be done electronically and in advanced designs provide for a partial discharge.

Electrical: Stored in a battery like a capacitor so large discharges are possible. Note that a conventional battery could be used to recharge the device capable of high power release.

Compressed Gas: Very high pressure gas can be stored safely in canisters that have a fast valve or rupturing seal required to release the energy quickly.

Other Power Sources: Various methods of storing energy can be selected, but will in all cases be able to provide a high power outlet. Issues of power densities are design features that may be played against cost choices. For example, in one embodiment a spring loaded coil could be used.

Kinetic Energy Converter: Stored energy is converted into physical motion of mass within this part. A loaded cartridge of a gun is an example of where the contained powder is burned and the hot expanding gas presented to the chamber and projectile.

Chemical reactions that produce an expanding hot gas in a chamber that is designed like a gun barrel, where the gun barrel lumen is strong enough to contain the pressure in all but one direction.

Compressed gas works like a chemical reaction where a valve releases the gas rather than combustion.

Electrical power can be used to create a burst of magnetic force in a solenoid so as to work like a coil gun. A rail gun design provides continuous energy conversion and can prolong the acceleration. Both of these devices can be configured to create angular acceleration capable of rotating masses.

Projectile Mass: The mass to be accelerated can be referred to as a projectile. It consists of any combination of masses: solids, liquids or gases. Inertial energy is proportional to the square of the velocity and mass. Emphasizing acceleration reduces the total mass of the safety system as the mass of the fuel is small in comparison. One issue it that the higher end speed required by the higher acceleration results in a long trajectory. The projectile, in the form of a solid is most commonly shaped like a bullet, but granulated material like pellet shot, will work. Liquid can also be used as long as the drag and vaporization issues are managed. The gases used in creating the mass acceleration are a part of the kinetic response and are included in the design calculations. The projectile can function as the energy container as well. This would be like a small rocket that carries its fuel with it. The primary benefit here is the reduction of total mass to be carried in the helmet or other safety gear. More than one projectile can be used in order to manage the combined acceleration moment. This plurality of the projectiles can be used to sum the plurality of their kinetic pushes. For example, if two circular arc paths in different planes are traversed the resulting direction of force will be along the sum of their vectors.

Projectile Guide: Each guide controls the direction of its projectile. Since the high end speed and total time of required acceleration the path length due is longer than most body parts or safety gear. In one embodiment, the projectile guide is physically located inside the remainder of the counterforce safety system. In one embodiment, the projectile guide is physically located outside the remainder of the counterforce safety system.

Circular Path: One method to accommodate this is to use a circular path and create a torque on the axis of the path. In a helmet application this might be a path (#1) that encircles the crown and would serve to twist the helmet on the neck axis. Additional circular paths in substantially orthogonal planes (right front to left back #2 and left front to right back #3) provide for a kinetic torque in any direction. Accelerating projectiles along #2 and #3 but not long #1 would serve to force the head in a forward or backward direction based on the direction of the projectile.

Straight Path: Short straight paths serve to impart short corrective forces. If the acceleration is large a significant change in the collision can occur. For example, imagine the usefulness of a heel cup in a military boot capable of diffusing the upward force of a land mine that would otherwise cause a bone fracture.

Inertial sensor: In one embodiment, this device serves as a selective trigger and/or control of the energy converter. It can direct the mass in a forward or backward direction as needed. In addition it can signal a change in the acceleration curve of the projectile which could result in opening a vent for a gas driven projectile. In an electric converter power relays can change outputs very quickly. In one embodiment, the inertial sensor is physically located inside the remainder of the counterforce safety system. In one embodiment, the inertial sensor is physically located outside the remainder of the counterforce safety system.

Feedback actuator: The kinetic push caused by the forced acceleration of the projectile reverses direction once the mass begins to slow down. This change of direction in the force needs to be redirected into a beneficial action, neutralized or limited. In the case of a straight path force of short duration, the de-acceleration period might make things worse by contributing to the original acceleration. A beneficial action would involve controlling the acceleration so as to limit the original impact in one direction and then to use the deceleration force to begin to pull the helmet back in anticipation of an impact with the ground. Minimizing the deceleration can also be as simple as providing for an extended coast.

Sensor-trigger: An inertial sensor attached to the protective device needs to provide information about the initial movement of the helmet. Impact force and direction can together describe the hit and provide the basis for a selective trigger/no selectively trigger signal. After that the information can be used to release the stored energy along the proper guides in the correct directions. In the simplest form, the sensor could be a mechanical system with a small mass attached with springs that serves to directly release the energy. In one embodiment, a data processor (discussed in detail below) can also manage one or more of a series of accelerometers. Some of these devices are already in equipment used to monitor or record movements (e.g., Nike Fuelband or an equivalent) and hits (e.g., a wireless accelerometer mouth guard or an equivalent) for concussion research. As discussed above and for all embodiments herein discussed, in one embodiment, the sensor-trigger is physically located inside the remainder of the counterforce safety system. In one embodiment, the sensor-trigger is physically located outside the remainder of the counterforce safety system. In one embodiment, a sensor-trigger is shared by two or more counterforce safety systems.

Data processor: The device that collects the impact information and by various means sends signals to the controller item which in turn activates the converter. This device can be as simple as the one mentioned above and purely mechanical. In one embodiment, the data processor can be any commercially available data processor (e.g., a microprocessor, a micro-controller, a Read Only Memory controller, or an equivalent). In one embodiment, this function can be performed by an average smart phone that has sufficient computer processing ability and memory resources to calculate the best responses, evaluate response selections against a stored data base of contexts, and in one embodiment even obtain feedback and correct the acceleration profile to improve results.

Figure 4:
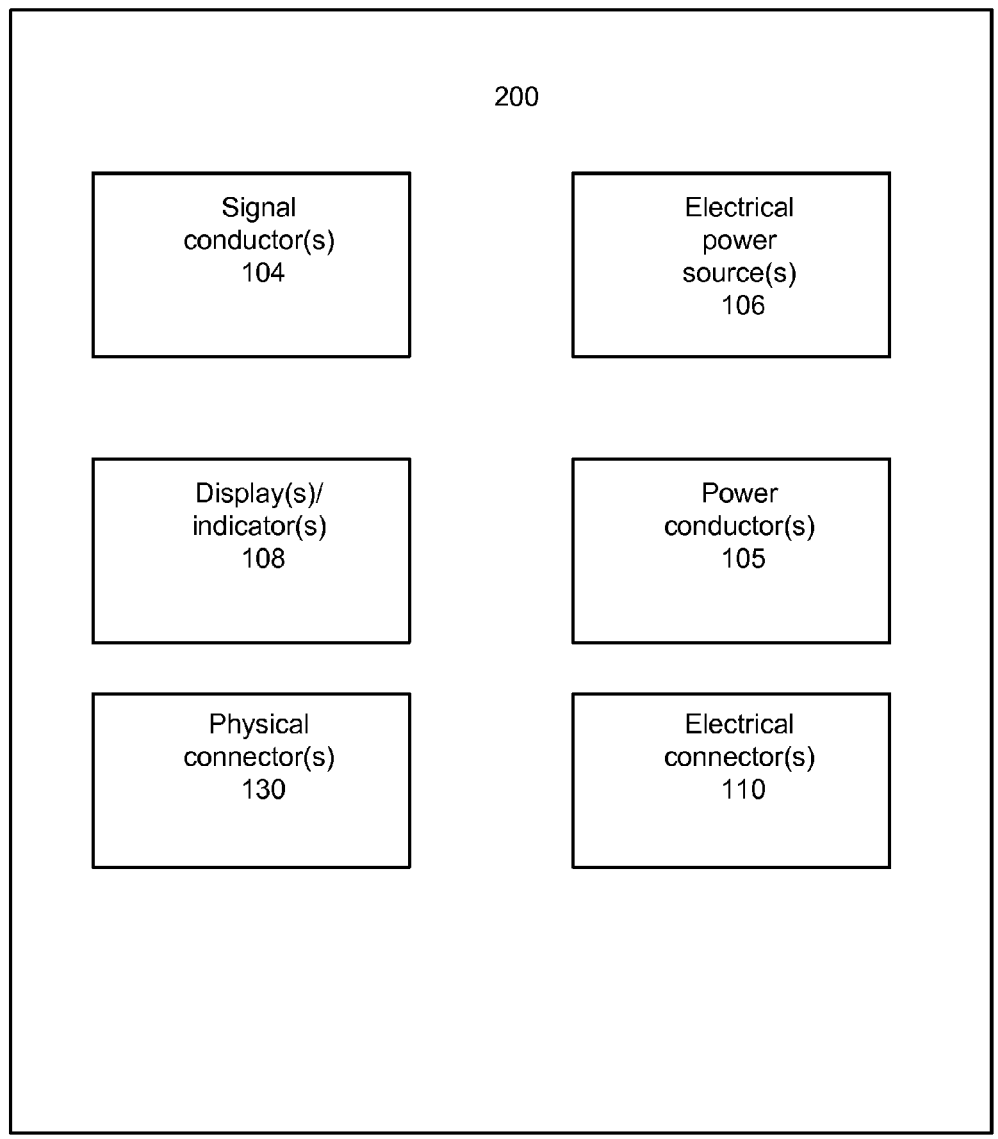
FIG. 4 illustrates a block diagram of the elements of a counterforce safety system, in accordance with another embodiment of the invention.

FIG. 4 illustrates a block diagram of the elements of an optional module, in accordance with one embodiment of the invention. In various embodiments, various elements of this module can be incorporated into the first module. In one embodiment, this module is a stand-alone module at a different location from the first module. Referring to FIG. 4, for the user to see one or more display(s) or indicator(s) 108 to determine if the safety system is activated or deactivated, there can be another optional module 200 that includes one or more signal conductor(s) 104 to connect to a counterforce safety system 100, one or more electrical power source(s) 106, one or more power conductor(s) 105 to connect the one or more power source(s) 106 to the display(s) or indicator(s) 108 and if needed also to the safety system 100, one or more status display(s) or indicator(s) 108, one or more electrical connector(s) 110 allowing the electrical attachment/detachment of the one or more electrical power source(s) 106 and status display(s) or indicator(s) 108, one or more physical connector(s) 130 for mechanical attachment of 106 and 108 to module 200.

In various embodiments of a counterforce safety system, the display(s) or indicator(s) 108 can be implemented by liquid crystal display (LCD), organic light emitting diode (OLED), light emitting diode (LED), or an equivalent display technology. In various embodiments, the display(s) or indicator(s) 108 can display one or more of the following: battery charge level, estimated remaining battery life, ground velocity, direction of movement, and clock time.

The electrical power source(s) 106 in various embodiments can be one or more batteries, a photovoltaic electrical module, an electrical recharger, or some other equivalent electrical energy source with a capacity for supplying an appropriate amount of voltage and current. One embodiment of the invention uses one or more electrochemical batteries (e.g., lithium ion batteries, typically rated at 3.6 volts under normal conditions and 4.2 volts when fully charged, or other equivalent electrochemical batteries, either single charge or rechargeable, or other equivalent power sources). Other embodiments can use any electrochemical battery technology.

Figure 5:
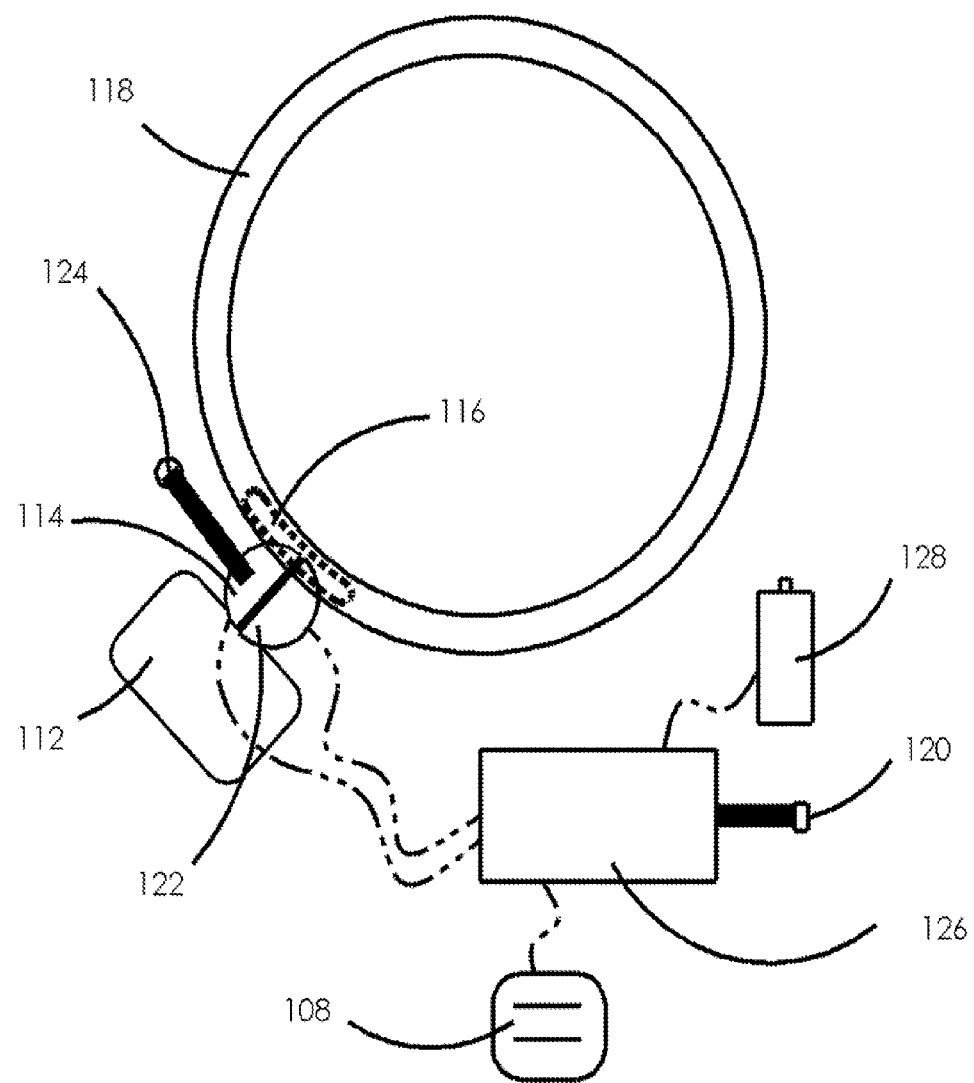
FIG. 5 illustrates a counterforce safety system, in accordance with another embodiment of the invention.

FIG. 5 illustrates a counterforce safety system, in accordance with one embodiment of the invention. Referring to FIG. 5, a counterforce safety system includes a stored energy holder 112, a kinetic energy converter 114, a projectile mass 116, a projectile guide 118, a feedback actuator 122, a sensor-trigger 124, a data processor 126, an electrical power source 128 to provide electrical power to operate the data processor 126, and one or more display(s) or indicators(s) 108, which typically also need electrical power.

One embodiment can be integrated into a helmet. One embodiment implemented in a helmet can be designed to counter head rotations along the axis of the neck which are known to be particularly damaging during extreme hits. In one embodiment, the helmet has a horizontal annular lumens (termed a halo) built into the helmet shell. The halo has an access port (breach) that allows the loading a projectile into the lumen. In one embodiment, the breach has a spring loaded pressure foot designed to secure the projectile at the breach location for G forces (i.e., accelerations equivalent to earth's gravity) below the acceleration that will be a selective trigger level.

In one embodiment, the projectile's design is similar to a rocket in that it contains a volume of compressed air as fuel adequate to accelerate the projectile at the required speed for the required duration. In one embodiment, the projectile can have a nozzle at each end so that it can be launched in either direction and a port that has only two states, fully closed or fully open. A selective trigger sensitive to rotational acceleration normal to the halo (mounted at the crown of the helmet) and above the selectively trigger level will send a signal that opens the nozzle best able to counter the rotational impact. In one embodiment, for example, if the helmet is rotated clockwise, the projectile would be released to accelerate in a clockwise direction such that the impact rotation is limited. In one embodiment, once the compressed gas is discharged, the projectile and track are designed to provide a long slow down, and may involve a number of rotations. In one embodiment, resetting the helmet can involve using air pressure to retrieve the projectile at the port and replacing it with a charged projectile.

In one embodiment, a 3D version can be integrated into a helmet that builds on the basic capabilities previously described. In one embodiment, the helmet has three substantially orthogonal annular lumens (termed halos) built into the helmet shell. Each halo has an access port (breach) that provides for loading the projectile into the lumen. The breach has a spring loaded pressure foot designed to secure the projectile at the breach location for G forces below the acceleration selectively trigger level.

In one embodiment, the projectile's design is like a rocket in that it contains a volume of compressed air as fuel adequate to accelerate the projectile at the required speed for the required duration. Each projectile has a nozzle at each end so that it can be launched in either direction. Each projectile has a nozzle at each end so that it can be launched in either direction. Each port can be adjusted to a variable opening at the selective trigger event so that the projectile is released with a slower acceleration.

A selective trigger sensitive to rotational acceleration normal to each of the halos is mounted on the helmet on the halo's axis. The selective trigger is able to send an opening signal able to control the opening size of the projectile nozzle. The selective triggers are interconnected so that any when any selective trigger exceeds a selective trigger threshold all the selective triggers send signals to their projectiles. Each projectile is launched in the direction of rotation of their halo. If the helmet is rotated clockwise the projectile would be released to accelerate in a clockwise direction such that the impact rotation is limited. At any selectively trigger event, all projectiles are released at nozzle openings and directions determined by their selectively triggers. The combined rotational accelerations of the projectiles in the three halos provide a matched response to the initial impact. Once the compressed gas is discharged in all three tracks, the projectiles and tracks are designed to provide a long slow down, and may involve a number of rotations. Resetting the helmet involves using air pressure to retrieve the projectiles at their ports and replacing them with charged projectiles.

Figure 6:
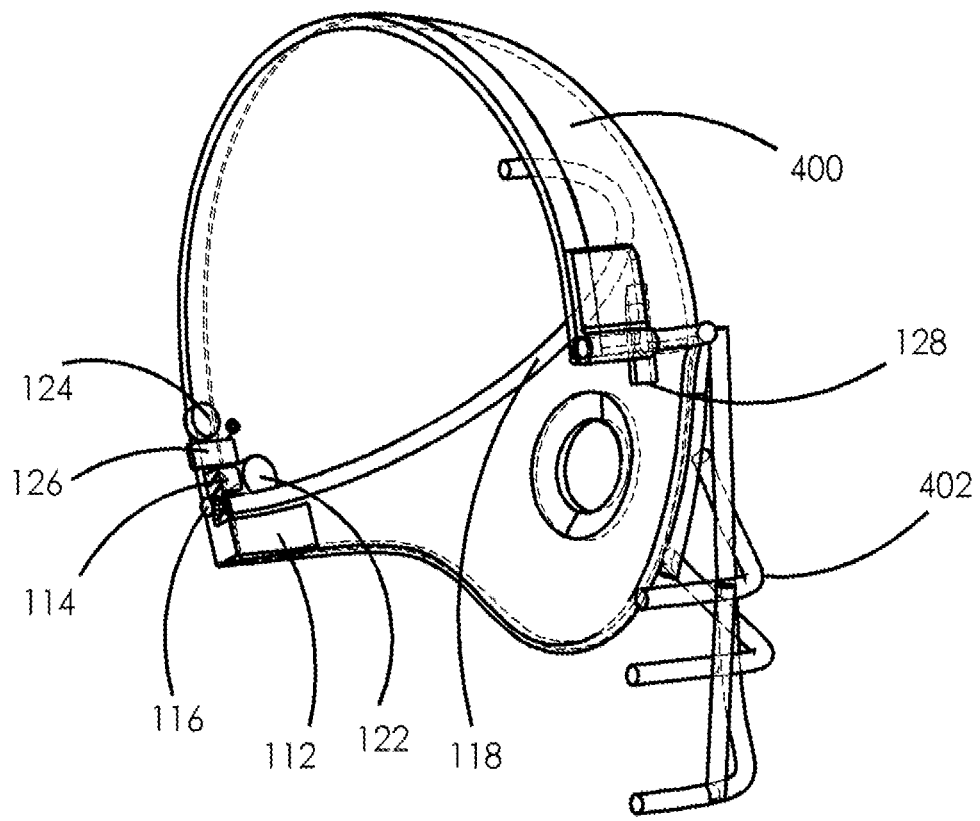
FIG. 6 illustrates a counterforce safety system in a helmet, in accordance with one embodiment of the invention.

FIG. 6 illustrates a counterforce safety system in a helmet, in accordance with one embodiment of the invention. Referring to FIG. 6, a helmet 400 with an optional face guard 402 includes a stored energy holder 112, a kinetic energy converter 114, a projectile mass 116, a projectile guide 118, a feedback actuator 122, a sensor-trigger 124, a data processor 126, and an electrical power source 128.

There are various embodiments of this invention in besides helmets. The ability to provide a directed force of adequate strength at the right time can prevent stains, sprains, fractures and tears. A kinetic counterforce "shove" created out of a controlled acceleration can increase a person's safety in many ways.

Shoes and Boots

Many injuries, for example, are caused by situations where a foot is pinned to the ground while a person continues forward movements. In various embodiments, a counter force directed in the right time and direction could limit damage by reorienting the limb in a fraction of a second, help to free the foot or even redirect the person's body enough to limit injury. A simulation of the event can calculate how to apply a counterforce to align a person's foot in a safer way by applying a linear force and/or a rotational force Another embodiment of the invention would be a shoe or boot capable of preventing ankle sprains. Normally the event happens so fast that by the time a person wearing the shoe or boot is aware of pain, the damage is done. If a sensor in the shoe or boot is capable of sensing a dangerous joint flex caused by the hyper rotation, a stored energy can release a rotational torque on the shoe or boot for a period of time adequate for the event to become noticeable.

A simple version of a sprain resistant shoe or boot uses the invention to provide a rotation moment able to counter the twisting of an ankle landing on an obstacle (e.g., rock, trench, another shoe, or equivalents). Stored energy in the shoe or boot is converted into high angular rotation of a small mass located in the heel cup area of the shoe or boot. The rotational axis is along the length of the foot or boot, and in one embodiment only provides protection for an outward rotation, which is what happens when the shoe or boot lands on an unexpected obstacle. Other embodiments of the invention can provide protection for more than one rotational axis.

In one embodiment, an angle sensor near the ankle of a user's foot selectively triggers when forces are above a prescribed safety level, indicating a sprain is imminent. This signal then trips a circuit that releases energy stored in a capacitor located in the shoe. In one embodiment, the accelerated mass is a conductive disk mounted on a rotation axis oriented bearing in the heel cup. In one embodiment, the perimeter of the conductive disk has contact with a pair of annular rings and provides a short circuit between the rings. Power delivered to the rings at the selectively trigger event cause the disc to spin up to speed rapidly, creating an acceleration of the disc and a significant rotational torque on the rotation axis. Accelerating the top of the disc towards the outside creates a correcting force on the shoe or boot. The temporary force resists the outward rotation of the ankle for a fraction of a second, which can prevent injury by giving the user time to react to take the weight off their foot. The deceleration phase is prolonged by insuring a free rotation of the disc.

Figure 7:
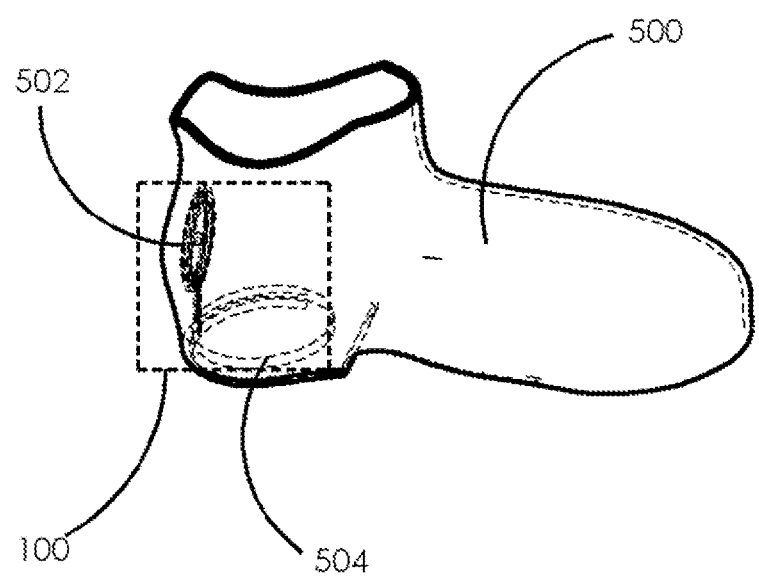
FIG. 7 illustrates a counterforce safety system in a shoe or boot, in accordance with one embodiment of the invention.

FIG. 7 illustrates a counterforce safety system in a shoe or boot, in accordance with one embodiment of the invention. The shoe or boot 500 has a counterforce safety system 100 in proximity to the rear portion with an angle sensor 502 and a projectile guide 504 in the heel of the shoe or boot.

Legs and Knees

In addition, the kinetic push created from stored energy may be able to move human body parts in ways that exceed what human muscles and joints normally are able to do. A side hit to the knee that might tear a ligament may result because there are not enough muscles to move the joint in the required direction or have adequate strength to do so. A counterforce with the correct force and timing can provide protection against a side injury of the knee. As discussed above, in one embodiment, the sensor-trigger is physically located inside the remainder of the counterforce safety system. In one embodiment, the sensor-trigger is physically located outside the remainder of the counterforce safety system. In one embodiment, a sensor-trigger can be shared by two or more counterforce safety systems.

Figure 8:
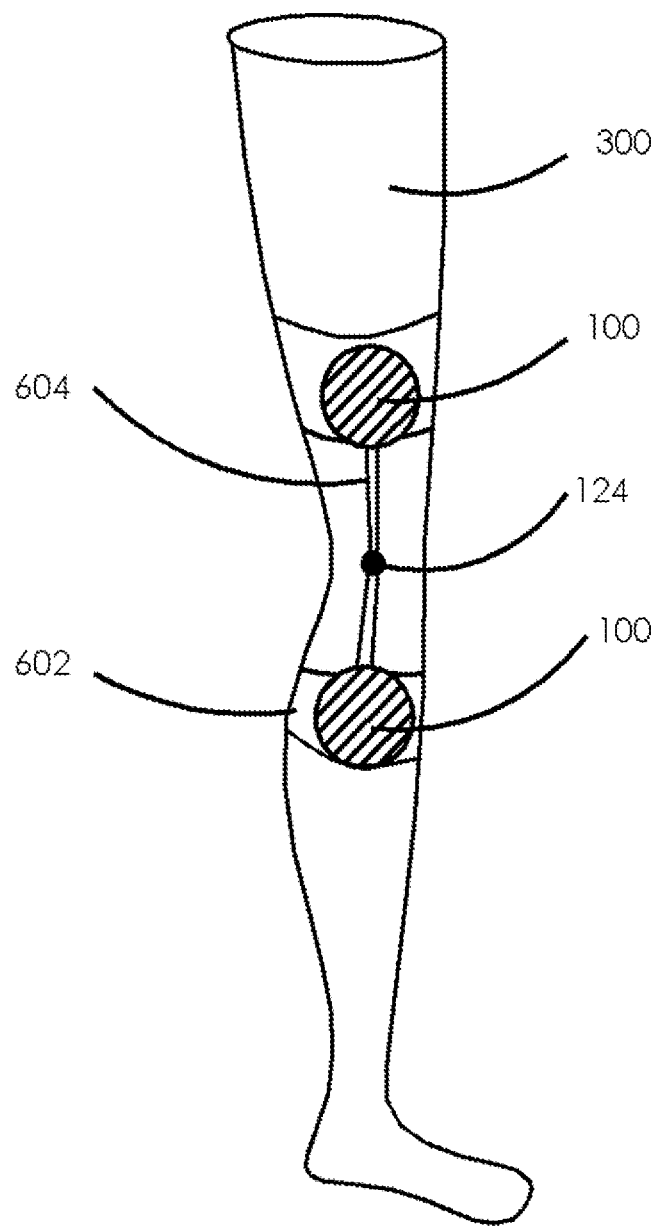
FIG. 8 illustrates a counterforce safety system to protect the knee of a user, in accordance with one embodiment of the invention.

FIG. 8 illustrates a counterforce safety system to protect the knee of a user, in accordance with one embodiment of the invention. One embodiment of the invention can provide protection against a hyper-extension of the knee or a side injury. The leg of a user 300 has a counterforce safety system 100 adjacent to the knee, with a brace 602 and side-braces 604, and a shared sensor-trigger 124. In one embodiment, the sensor-trigger 124 responds to the relative position of the ends of the side-braces 604. A forward or backward dislocation, or a side to side dislocation above a known safety limit will directly strain a ligament in the knee between the upper leg bone and the lower leg bone. As one example, a common anterior cruciate ligament (ACL) knee failure typically happens when the upper leg bone end rides over the bottom leg bone end. Forcing the upper leg bone to twist back while forcing the bottom leg bone forward will help. Feedback will prevent an injury from overcompensation.

Figure 9:
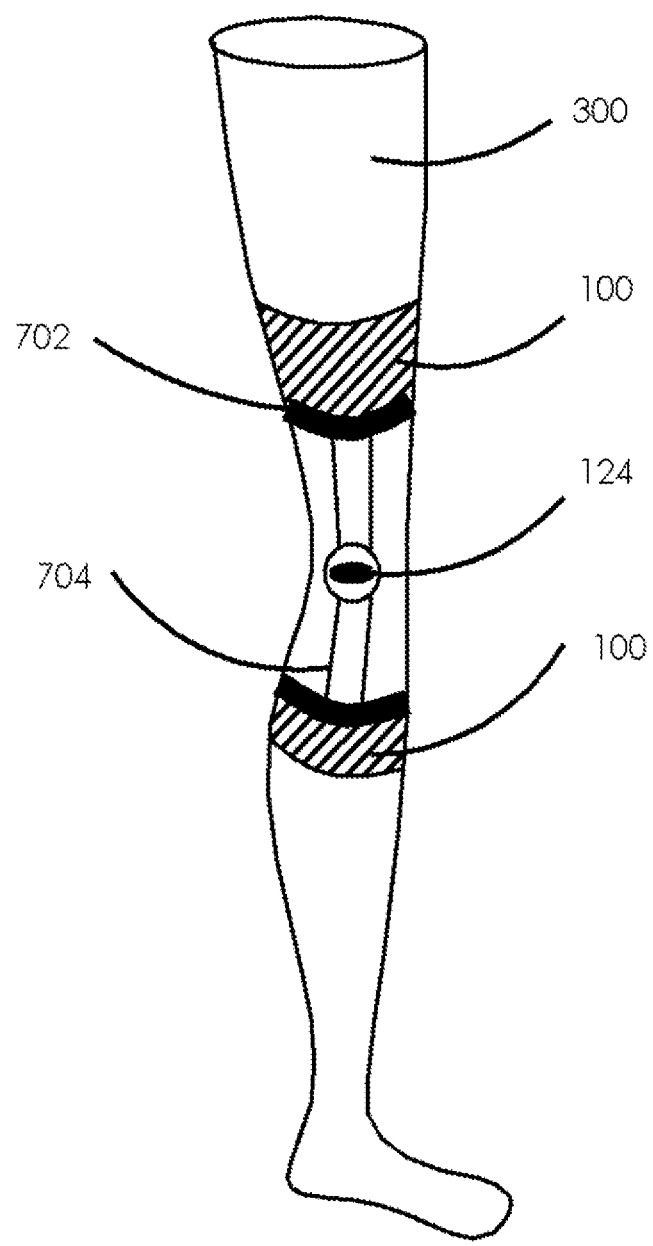
FIG. 9 illustrates a counterforce safety system to protect a leg ligament of a user, in accordance with another embodiment of the invention.

FIG. 9 illustrates a counterforce safety system to protect a leg ligament of a user, in accordance with another embodiment of the invention. The leg of a user 300 has two counterforce safety systems 100 including a sensor-trigger 124, each with a brace 702 and side-brace 704 that are in proximity to a leg ligament. In one embodiment, a shared sensor-trigger 124 responds to the relative position of the ends of the side-braces 704. A rotational torque force from each counterforce safety system 100 is activated to limit a critical twist between the upper and lower legs. The rotational torque forces will be activated in opposite directions in order to align both the upper and lower legs until a safe alignment is achieved. Feedback will prevent an injury from overcompensation. In one embodiment, a twist sensor (not shown) is used near the sides of the upper and lower legs. In another embodiment, inertial sensors (not shown) in the top and bottom legs could be compared to set a sensor-trigger 124.

Figure 10:
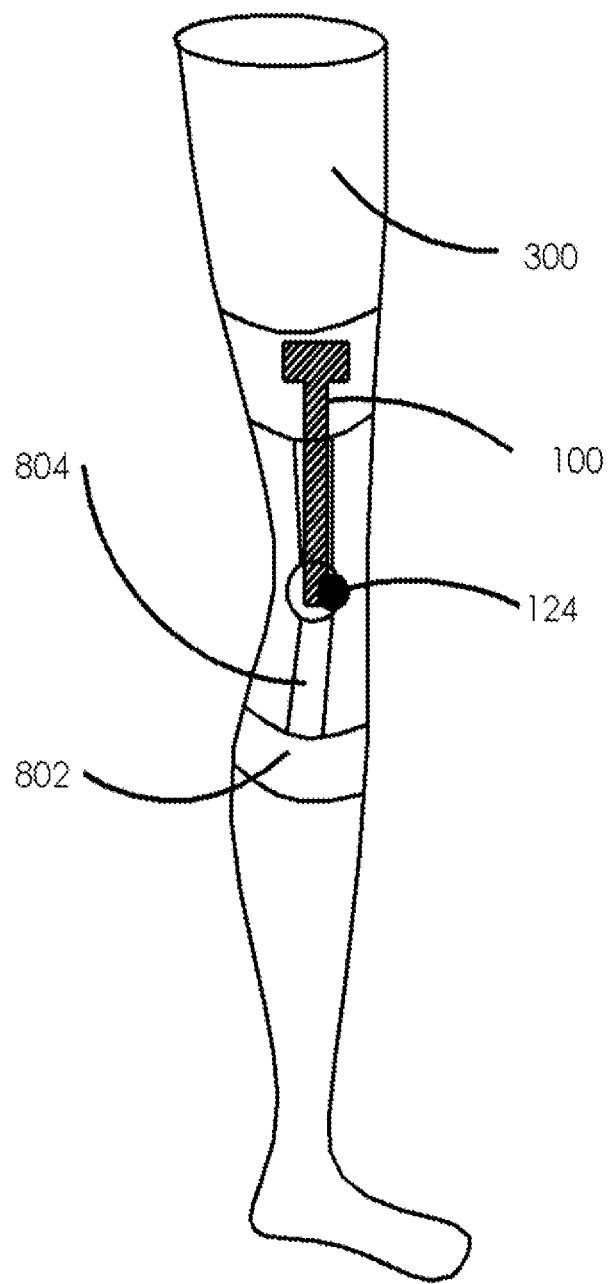
FIG. 10 illustrates a counterforce safety system to protect the meniscus of a knee of a user, in accordance with one embodiment of the invention.

FIG. 10 illustrates a counterforce safety system to protect the meniscus of a knee of a user, in accordance with one embodiment of the invention. The leg of a user 300 has a counterforce safety system 100 adjacent to the upper thigh, with a brace 802 and a side-brace 804 and including a sensor-trigger 124. One embodiment can lift up the upper thigh right at the moment of maximum compression on the knee. Normally the foot is planted on the ground, so limiting the maximum impact is important. If the counterforce safety system 100 has a downward projectile mass acceleration, this would push the thigh up momentarily to reduce the impact. In one embodiment, the sensor-trigger 124 is located near the knee to measure the brace 802 force. In one embodiment, there is an inertial sensor reading for both the upper and lower legs as seen at a lower and upper brace. In one embodiment, there are two counterforce safety systems 100 and two sensor-triggers 124. In one embodiment, there are two counterforce safety systems 100 and one shared sensor-trigger 124.

Bicycles and Motorcycles

Figure 11A:
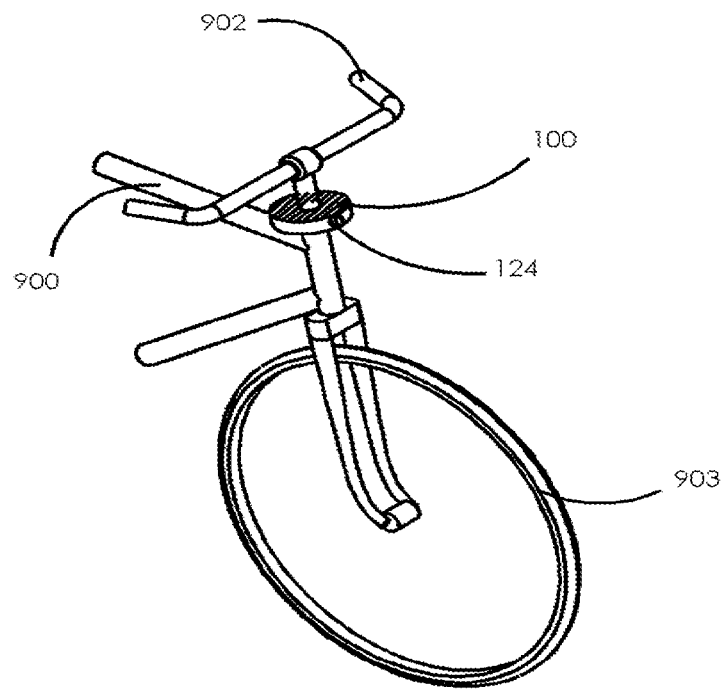
FIG. 11A illustrates a counterforce safety system installed in a bicycle, in accordance with one embodiment of the invention.

FIG. 11A illustrates a counterforce safety system installed in a bicycle, in accordance with one embodiment of the invention. A counterforce safety system 100 including a sensor-trigger 124 is installed on the fork shaft of a bicycle 900 in proximity to the handlebars 902 in order to provide a counterforce that will increase the safety of a user (not shown) when an impact force from an obstacle hits the front tire 903 of the bicycle 900. For example, in one embodiment when an abrupt and powerful collision with the front tire 903 creates an impact force that exceeds a threshold, the counterforce safety system 100 is activated and forces the handle bars back toward the center position. This is especially helpful for the safety of a user riding a motorbike or motorcycle where the speed is greater and the impact forces are greater.

Figure 11B:
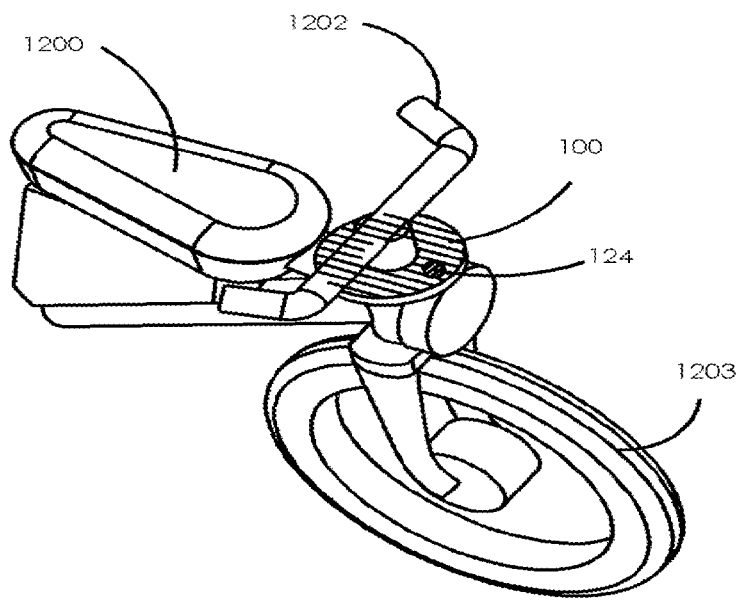
FIG. 11B illustrates a counterforce safety system installed in a motorcycle, in accordance with one embodiment of the invention.

FIG. 11B illustrates a counterforce safety system installed in a motorcycle, in accordance with one embodiment of the invention. A counterforce safety system 100 including a sensor-trigger 124 is installed on the fork shaft of a motorcycle 1200 in proximity to the handlebars 1202 in order to provide a counterforce that will increase the safety of a user (not shown) when an impact force from an obstacle hits the front tire 1203 of the motorcycle 1200.

Ski and Snowboard Safety:

Another application of an embodiment of the invention would be to apply a force at the tip of a ski or snowboard that is caught by an obstacle so as to free it and avoid a fall. The immediate intervention early in this event can provide a push able to free the ski's or snowboard's edge before the fall becomes eminent. An early push may also be more effective than that required by the skier's response after the additional flex is noticed by the skier and then compensated for via the boot. There is stored energy in the release mechanism of the ski, but it is used to release the ski under certain circumstances.

Figure 12:
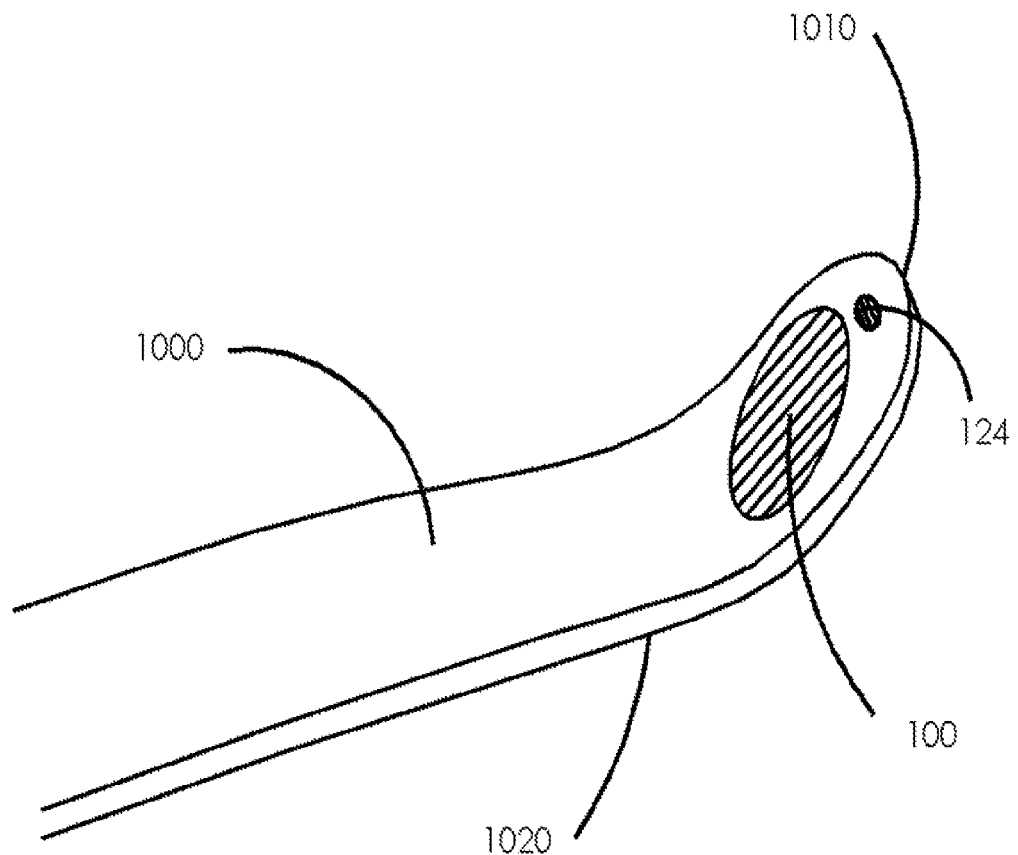
FIG. 12 illustrates a counterforce safety system installed in a ski or snowboard, in accordance with one embodiment of the invention.

FIG. 12 illustrates a counterforce safety system installed in a ski or snowboard, in accordance with one embodiment of the invention. A counterforce safety system 100 is installed near the tip 1010 of the front of a ski or snowboard 1000 so that when the bottom surface 1020 hits some obstacle (not shown) the counterforce safety system 100 can provide a counterforce that will increase the safety of a user (not shown) when an impact force hits the bottom surface 1020. In one embodiment, the counterforce safety system 100 will lift an edge of the ski or snowboard 1000 that is being caught by an obstacle. Normal skiing and snowboarding experience many vibrations and impacts, but in the event of a prolonged twist along the axis of the ski or snowboard and an inertial tug sideways there probably a fall coming. This is especially true if only one ski is doing this. In one embodiment, the sensor-trigger 124 can be a 2 axis accelerometer (to measure twists and horizontal forces). In one embodiment, the counterforce safety system 100 is activated and creates a rotational force torque to push the tip of the ski or snowboard either left or right for a fraction of a second.

Chairs and Vehicles

Figure 13A:
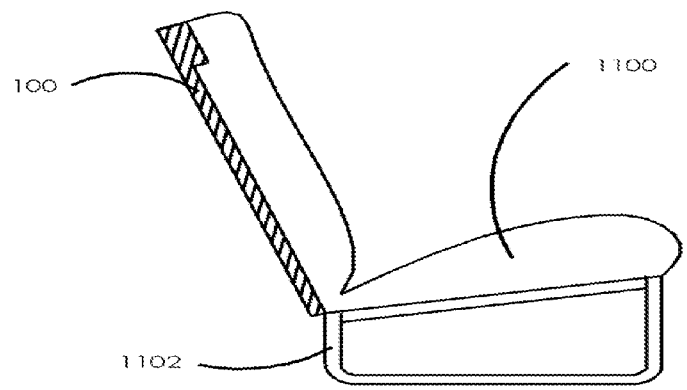
FIG. 13A illustrates a counterforce safety system installed in a chair, in accordance with one embodiment of the invention.

FIG. 13A illustrates a counterforce safety system installed in a chair, in accordance with one embodiment of the invention. A counterforce safety system 100 is installed in the back of a chair 1100 on supporter 1102 to provide a counterforce that will increase the safety of a user (not shown) when an impact force hits the chair 1100. The chair 1100 could be inside any vehicle (e.g., car, truck, train, airplane, military vehicle, and equivalents) where harmful accelerations from any cause could harm the person sitting in the chair 1100.

Figure 13B:
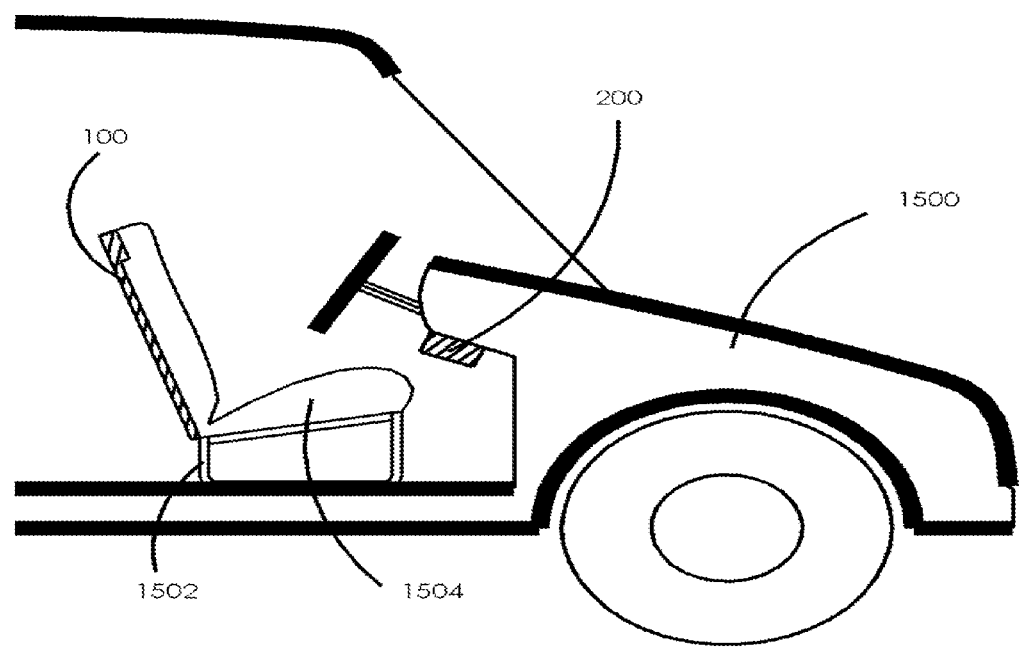
FIG. 13B illustrates a counterforce safety system installed in a chair in a vehicle, in accordance with one embodiment of the invention.

FIG. 13B illustrates a counterforce safety system installed in a chair in a vehicle, in accordance with one embodiment of the invention. A counterforce safety system 100 is installed in the back of a vehicle 1500 with a chair 1504 on a supporter 1502 to provide a counterforce that will increase the safety of a person (not shown) when an impact force hits the chair 1504. A second module 200 in various embodiments can be installed in the vehicle near the person. The second module 200 can provide one or more displays or indicators to inform the person of the activation and status of the counterforce safety system 100, as well as provide electrical power to the counterforce system 100 if needed. The chair 1504 could be inside any vehicle (e.g., car, truck, train, airplane, military vehicle, and equivalents) where detected accelerations or decelerations from any cause might harm the person sitting in the chair 1504 and thus trigger the activation of the counterforce safety system 100 to mitigate the harmful effects. One embodiment of the invention provides a display to indicate one or more parameters useful for the user, such as battery charge level, estimated remaining battery life, system status and equivalent parameters.

Possible Projectile Paths

Figure 14A:
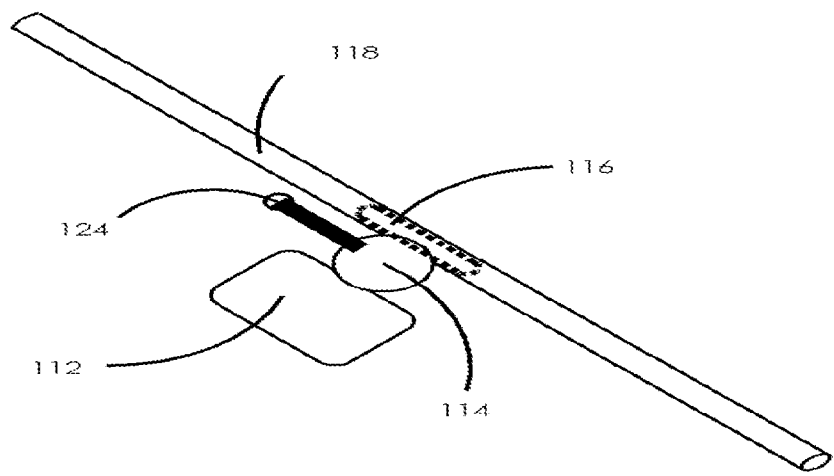
FIG. 14A illustrates a straight projectile path of a counterforce safety system, in accordance with one embodiment of the invention.

FIG. 14A illustrates a straight projectile path of a counterforce safety system, in accordance with one embodiment of the invention. Illustrated are a stored energy holder 112; a kinetic energy converter 114 to be powered by the stored energy holder 112; a projectile mass 116 to be accelerated by the kinetic energy converter; a projectile guide 118 to guide the projectile mass along a desired path, and a sensor-trigger 124.

Figure 14B:
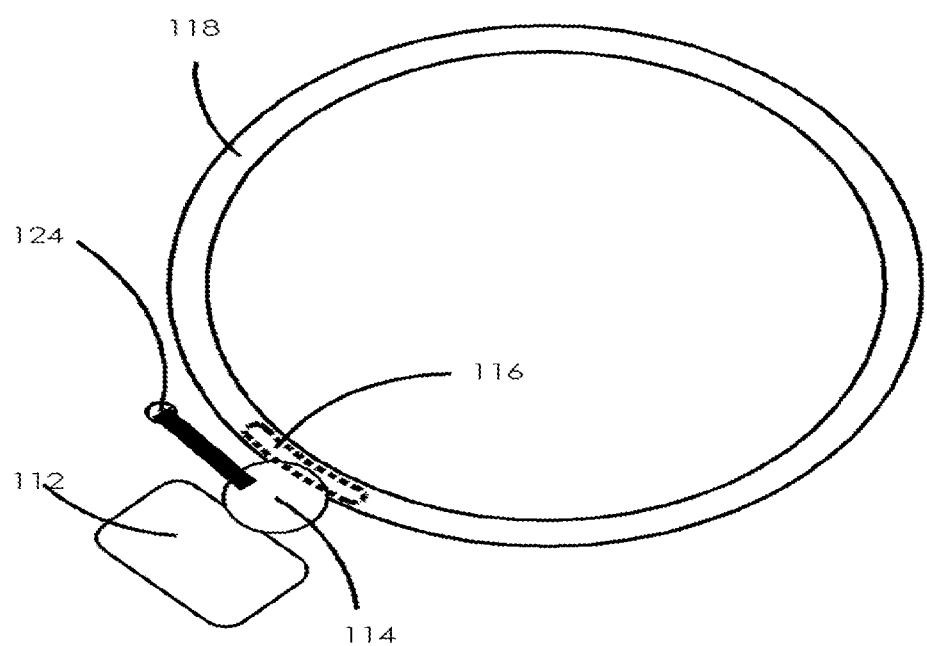
FIG. 14B illustrates a curved projectile path of a counterforce safety system, in accordance with one embodiment of the invention.

FIG. 14B illustrates a curved projectile path of a counterforce safety system, in accordance with one embodiment of the invention. Illustrated are a stored energy holder 112; a kinetic energy converter 114 to be powered by the stored energy holder 112; a projectile mass 116 to be accelerated by the kinetic energy converter; a projectile guide 118 to guide the projectile mass along a desired path, and a sensor-trigger 124.

Methods of Fabrication

Figure 15:
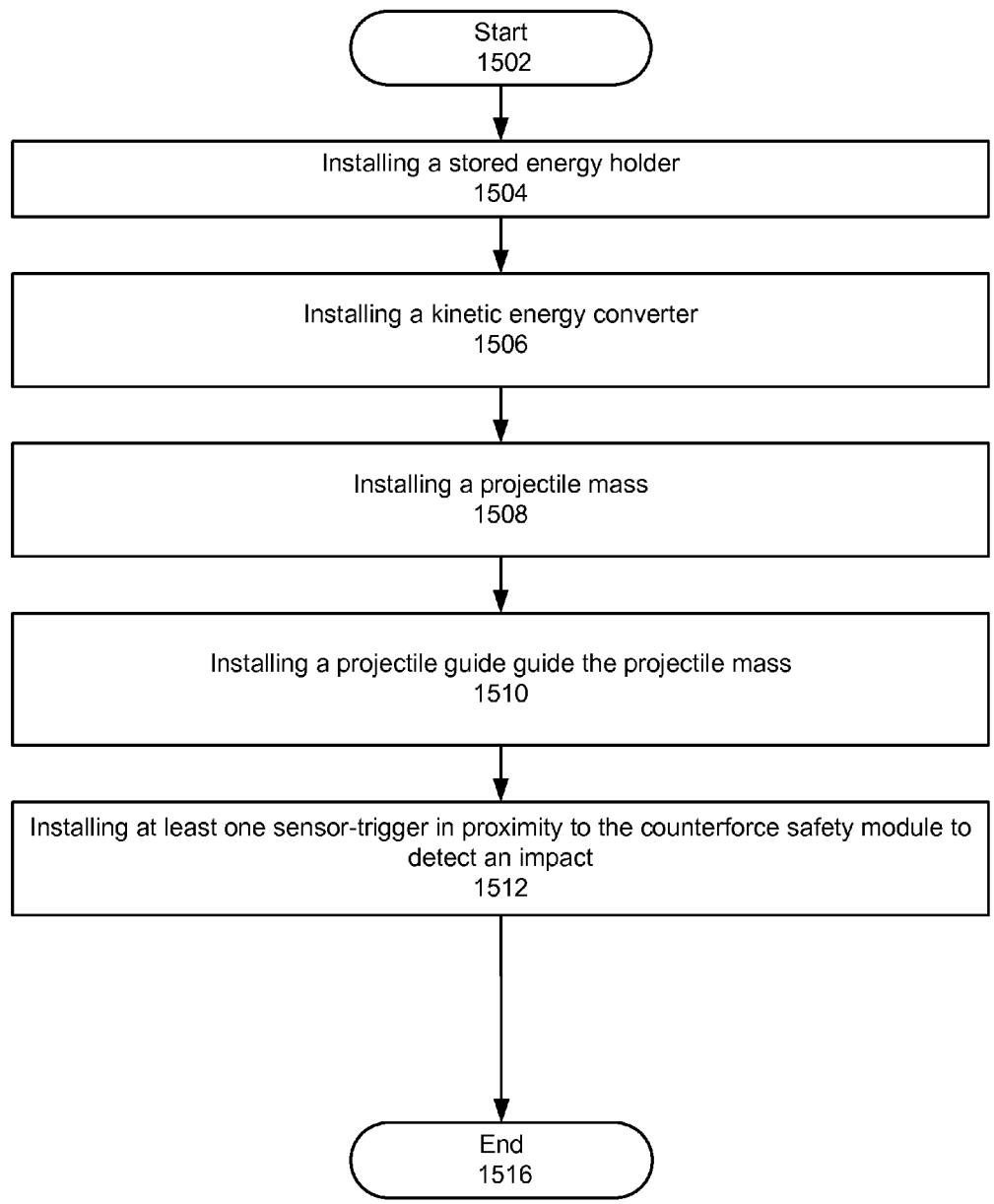
FIG. 15 illustrates a flowchart of a method to make a counterforce safety system, in accordance with one embodiment of the invention.

FIG. 15 illustrates a flowchart to make counterforce safety system, in accordance with one embodiment of the invention. The method starts in operation 1502. Operation 1504 is next and includes installing a stored energy holder. Operation 1506 is next and includes installing a kinetic energy converter to be powered by the stored energy holder. Operation 1508 is next and includes installing a projectile mass to be accelerated by the kinetic energy converter. Operation 1510 is next and includes installing a projectile guide in proximity to the counterforce safety system to guide the projectile mass along a desired path. Operation 1512 is next and includes installing at least one sensor in proximity to the counterforce safety system to detect an impact and selectively trigger the counterforce safety system. The method ends in operation 1516.

Figure 16:
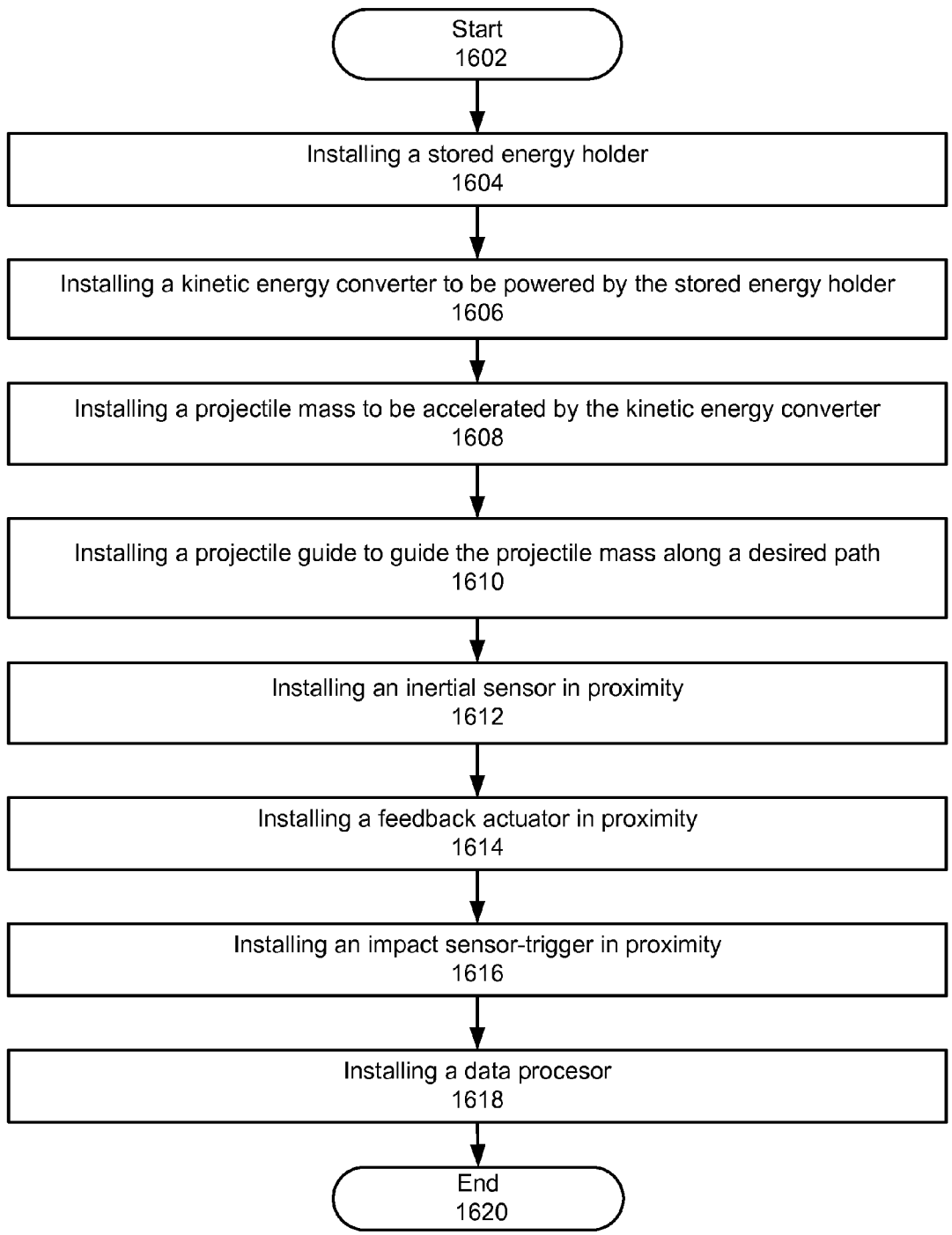
FIG. 16 illustrates a flowchart of a method to make a counterforce safety system, in accordance with another embodiment of the invention.

FIG. 16 illustrates a flowchart to make counterforce safety system, in accordance with another embodiment of the invention. The method starts in operation 1602. Operation 1604 is next and includes installing a stored energy holder. Operation 1606 is next and includes installing a kinetic energy converter to be powered by the stored energy holder. Operation 1608 is next and includes installing a projectile mass to be accelerated by the kinetic energy converter. Operation 1610 is next and includes installing a projectile guide in proximity to the counterforce safety system to guide the projectile mass along a desired path. Operation 1612 is next and includes installing an inertial sensor in proximity to the counterforce safety system. Operation 1614 is next and includes installing a feedback actuator in proximity to the counterforce safety system. Operation 1616 is next and includes installing a sensor-trigger in proximity to the counterforce safety system. Operation 1618 is next and includes installing a data processor in the counterforce safety system to selectively trigger the counterforce safety system. The method ends in operation 1620.

The exemplary embodiments described herein are for purposes of illustration and are not intended to be limiting. Therefore, those skilled in the art will recognize that other embodiments could be practiced without departing from the scope and spirit of the claims set forth below.

What is claimed is:

1. A kinetic response system, comprising:
   an impact member to receive an impact force thereto;
   one or more annular guides positioned proximate the impact member;
   one or more projectile masses to respectively travel along the one or more annular guides;
   a kinetic energy converter to accelerate the one or more projectile masses along the one or more annular guides; and
   a controller to selectively trigger the kinetic energy converter to accelerate the one or more projectile masses along the one or more annular guides in response to the impact force contributing to acceleration of the impact member above a defined threshold.

2. The kinetic response system of claim 1, wherein the accelerated one or more projectile masses create a net rotational force directed against the impact force.

3. The kinetic response system of claim 2, wherein the net rotational force causes a kinetic push of the impact member in opposition to the impact force.

4. The kinetic response system of claim 3, wherein in response to the kinetic push of the impact member, the impact member experiences a maximum acceleration rate less than a maximum acceleration rate of the impact member absent the kinetic push.

5. The kinetic response system of claim 1, further comprises a stored energy holder to power the kinetic energy converter.

6. The kinetic response system of claim 5, wherein the stored energy holder stores energy in at least one of a mechanical, chemical, electrical, and gaseous form.

7. The kinetic response system of claim 5, wherein the kinetic energy converter converts the stored energy into acceleration of the one or more projectile masses along the one or more annular guides.

8. The kinetic response system of claim 7, wherein the kinetic energy converter comprises a chamber presented with at least one of hot expanding gas, compressed gas, and magnetic force.

9. The kinetic response system of claim 1, wherein the controller comprises one or more sensors to detect magnitude and direction of the impact force on the impact member.

10. The kinetic response system of claim 9, wherein the controller determines the net direction and magnitude of the impact force and selectively triggers acceleration of the one or more projectile masses such that a sum of respective acceleration rates associated with the one or more projectile masses along the one or more annular guides is directed opposite the impact force.

11. The kinetic response system of claim 10, wherein the sum of respective acceleration rates associated with the one or more projectile masses creates a response force against the impact member to counter the impact force.

12. The kinetic response system of claim 10, wherein the one or more annular guides are curved paths arranged orthogonally.

13. The kinetic response system of claim 9, wherein the controller selectively triggers deceleration of the one or more projectile masses such that a sum of deceleration rates associated with the one or more projectile masses is directed opposite a subsequent ground impact force prior to ground impact.

14. The kinetic response system of claim 9, further comprising a data processor communicatively coupled to the controller, the data processor calculates an acceleration triggering response based on the net direction and magnitude of the impact force collected from the controller.

15. The kinetic response system of claim 1, wherein the controller triggers the kinetic energy converter when the impact force contributes to acceleration of the impact member above a prescribed safety level.

16. The kinetic response system of claim 1, wherein the projectile mass comprises one of a solid, liquid, gas or any combination thereof.

17. The kinetic response system of claim 1, wherein the impact member is at least one of a helmet, snowboard, ski, shoe, ankle brace, knee brace, bicycle, motor bike, motorcycle, chair, vehicle, boat, airplane or the like.

\* \* \* \* \*